United States Patent [19]
Speasl et al.

[11] Patent Number: 5,952,958
[45] Date of Patent: Sep. 14, 1999

[54] POSITIONING SYSTEM AND METHOD

[75] Inventors: Jerry A. Speasl, Pleasanton; Leonard Schupak, Mission Viejo, both of Calif.

[73] Assignee: Discovision Associates, Irvine, Calif.

[21] Appl. No.: 09/086,900

[22] Filed: May 29, 1998

Related U.S. Application Data

[62] Division of application No. 08/628,360, Apr. 5, 1996.

[51] Int. Cl.$^6$ ............................ G01S 5/02; H04B 7/185
[52] U.S. Cl. .......................................................... 342/357
[58] Field of Search ................................. 342/357, 442, 342/446, 451, 457; 340/870.31; 324/207, 208; 364/300, 449; 343/459, 463, 464, 450, 451

[56] References Cited

U.S. PATENT DOCUMENTS

| | | |
|---|---|---|
| 1,715,433 | 6/1929 | Stone . |
| 4,656,463 | 4/1987 | Anders et al. . |
| 4,710,708 | 12/1987 | Rorden et al. ............................ 324/207 |
| 4,754,280 | 6/1988 | Brown et al. ............................ 342/357 |
| 4,918,425 | 4/1990 | Greenberg et al. . |
| 5,021,792 | 6/1991 | Hwang ..................................... 342/357 |
| 5,051,741 | 9/1991 | Wesby . |
| 5,101,356 | 3/1992 | Timothy et al. ......................... 364/449 |
| 5,185,610 | 2/1993 | Ward et al. .............................. 342/357 |
| 5,252,982 | 10/1993 | Frei ......................................... 342/357 |
| 5,266,958 | 11/1993 | Durboraw, III ......................... 342/357 |
| 5,268,695 | 12/1993 | Dentinger et al. ...................... 342/357 |
| 5,296,861 | 3/1994 | Knight .................................... 342/357 |
| 5,311,185 | 5/1994 | Hochstein et al. . |
| 5,334,974 | 8/1994 | Simms et al. . |
| 5,349,531 | 9/1994 | Sato et al. .............................. 364/449 |
| 5,363,425 | 11/1994 | Mufti et al. . |

(List continued on next page.)

FOREIGN PATENT DOCUMENTS

| | | | |
|---|---|---|---|
| 3226912A1 | 1/1984 | Germany ......................... G01S 3/06 |
| 58-28675 | 2/1983 | Japan ................................ G01S 3/48 |
| 62-883 | 1/1987 | Japan ................................ G01S 5/14 |
| 2-187681 | 7/1990 | Japan ................................ G01S 5/14 |
| 6-174820 | 6/1994 | Japan ................................ G01S 5/14 |

OTHER PUBLICATIONS

Isley, W C and D L Enders, "ATS–6 Interferometer" IEEE Transactions on Aerospace and Electronic Systems, vol. AES–11, No. 6, Nov. 1975, pp. 1165–1169.

National Marine Electronics, NMEA 0183 Standard For Interfacing Marine Electronic Devices, Oct. 15, 1995, New Bern, NC, U.S.A.

Tom Logsdon, The Navstar Global Positioning System, 1992, CHS. 2, 10, 15, New York, NY, U.S.A. (no month).

Tom Logsdon, The Navstar Global Positioning System , 1992, chs. 2, 10, 15, New York, NY, U.S.A. (no month).

National Marine Electronics, NMEA 0183 Standard for Interfacing Marine Electronic Devices, Oct. 15, 1995, New Bern, NC, U.S.A. (no month.

*Primary Examiner*—William Oen
*Attorney, Agent, or Firm*—Keiji Masaki; Donald Bollella; Clay E. Gaetje

[57] ABSTRACT

A positioning system for locating objects in places where standard Global Position System signals do not penetrate. A first embodiment uses a GPS receiver and a clock recovery unit. A computer receives the positional information and accurate time information. The computer calculates new orbital data for at least four pseudosatellites. The pseudosatellites are antennas positioned in an interior or shielded space and function to send pseudosatellite data to a receiver. In a second embodiment, the positions of the pseudosatellites are provided to the computer without the use of a GPS receiver. An accurate clock signal is also provided. The computer calculates orbital data for each pseudosatellite and transmits the time signal and ephemeris data for each pseudosatellite. The time signal is delayed for each pseudosatellite to account for propagation delays due to different connecting cable lengths.

5 Claims, 11 Drawing Sheets

U.S. PATENT DOCUMENTS

| | | | |
|---|---|---|---|
| 5,375,059 | 12/1994 | Krystos et al. | 364/449 |
| 5,379,045 | 1/1995 | Gilbert et al. | 342/357 |
| 5,384,574 | 1/1995 | Counselman, III | 342/357 |
| 5,388,147 | 2/1995 | Grimes . | |
| 5,418,525 | 5/1995 | Frei et al. . | |
| 5,442,558 | 8/1995 | Kyrtsos et al. | 364/449 |
| 5,446,465 | 8/1995 | Diefes et al. | 342/357 |
| 5,451,959 | 9/1995 | Schuermann . | |
| 5,461,387 | 10/1995 | Weaver | 342/357 |
| 5,506,588 | 4/1996 | Diefes et al. | 342/357 |
| 5,515,057 | 5/1996 | Lennen et al. | 342/357 |

POSITIONING SYSTEM AND METHOD

This application is a Divisional Continuation Application of U.S. Ser. No. 08/628,360 filed Apr. 05, 1996.

BACKGROUND OF THE INVENTION

1. Field of the Invention

This invention relates in general to positioning or location systems and, in particular, to such a system as utilized to locate objects within an interior space or shielded environment. More specifically, but without restriction to the particular embodiments hereinafter described in accordance with the current best mode of practice, this invention relates to a location positioning system for use in a shielded environment that utilizes GPS-type signals.

2. Discussion of the Related Art

The art of proximity detection and position location has been contributed to by a number of proposed devices and systems. These include, for example, the device discussed in U.S. Pat. No. 5,311,185 to Hochstein et al. which is directed to a proximity detection device relying on a transponder that periodically transmits status signals. Transceivers are fixed at locations about a structure for receiving and transmitting signals. U.S. Pat. No. 5,363,425 to Mufti et al. incorporates an identification badge having a radio frequency (RF) transmitter. Radio frequency (RF) receivers are located in telephones in various rooms of a structure. The location of the identification tag is determined to be the room with the nearest phone. Anders et al. in U.S. Pat. No. 4,656,463, propose a passive transceiver tag which is sensed by an active transceiver. This proximity control system forms the basis for a location, identification, and measurement of movement of inventory system, commonly referred to as a LIMIS system.

Prior devices and systems, as exemplified by those discussed above, have been directed to the use of proximity detection. Typically, these devices use a radio frequency (RF) transponder and a radio frequency (RF) receiver. Proximity is measured by detection of a signal or by signal strength. Current proximity devices, therefore, lack the ability of precisely measuring the location of an object.

One current type of location position system does, however, offer the advantage of precise location. Such an existing system is known as the Global Positioning System (GPS). This system includes a number of satellites in orbit around the Earth. Each satellite produces a continuous signal which carries both a time component and a space component having a number of orbital parameters associated therewith. A GPS receiver, employed in conjunction with an appropriately programed computer, is used to receive at least four of the satellite signals and therefrom determine a precise location of the receiver. This location information is typically presented as longitude, latitude, and altitude. One critical limitation of the GPS is that it requires the satellites to be "in view" relative to the receiver. This means that no obstruction can exist between the minimum number of satellites and the receiver. The standard GPS, therefore, will not function inside a building since the GPS signal is blocked by glass, metal, foliage, soil, brick, and various other materials which cause deflection of the signal. The GPS signal is optimally employed in an environment such as a flat desert or on the high seas. Thus, while the GPS has many important uses in wide open spaces, it is not currently available for use within interior spaces or shielded environments.

In addition to the U.S. patents discussed above, other related references deal exclusively with outside signals. Such references include, for example, U.S. Pat. No. 5,051,741 to Wesby; U.S. Pat. No. 5,334,974 to Simms et al.; and U.S. Pat. No. 4,918,425 to Greenberg et al.

Positioning systems are becoming widely recognized as being more important in today's society. There is a current need in business and industry to precisely locate and/or track the movement of people and material assets such as inventory or capital equipment. Structures such as the World Trade Center or large factories, which can employ thousands of people, currently desire the ability to locate people who may require assistance in reaching their intended destination. This is also true for large theme or amusement parks and other expansive tourist areas. In addition, this current need generally applies to people, objects, and inventory whether they may be located indoors, out-of-doors, or moving therebetween. The prior art devices and systems discussed above do not meet these needs because they lack precision or are currently incapable of operating within shielded environments or interior spaces.

Thus, prior to the present invention disclosed herein below, there has not been proposed a positioning system that precisely locates an object or person by utilizing GPS or GPS-type signals in an interior space or shielded environment.

OBJECTS AND SUMMARY OF THE INVENTION

It is, therefore, an object of the present invention to improve position location systems.

Another object of this invention is to increase the number of situations in which a GPS-based position location system may be utilized.

It is a further object of the present invention to employ GPS signals in a position location system which is not limited to use in only open and unobstructed areas.

Still another object of the present invention is to employ GPS-type signals in a position location system.

It is still a further object of the present invention to precisely locate by use of a GPS signal, an object positioned within an interior space.

Yet another object of the present invention is to precisely locate a stationary or moving object contained within a shielded environment by use of a GPS-type signal.

An additional object of the present invention is to precisely locate by use of a GPS signal, an object positioned within a shielded environment.

Yet a further object of the present invention is to precisely locate as a function of time, an object positioned within an interior space by use of a GPS-type signal.

It is yet a further object of the present invention to remotely detect the precise location of an object or person positioned within the interior of a large structure such as a multi-floor office building, a factory or warehouse, a manufacturing or processing facility such as a shipbuilding yard or oil refinery, or also so positioned in a sea going vessel or space craft.

Yet another additional object of this invention is to remotely detect the precise location of a person moving about within a theme park, amusement park, or other expansive tourist area that may be shielded from standard GPS signals to thereby assist the person in reaching a desired destination.

Still yet another object of the present invention is to utilize pseudosatellites to broadcast a corresponding GPS or GPS-type signal within an interior space or a shielded environment.

It is yet still another additional and further object of the present invention to precisely locate by use of a GPS or GPS-type signal, an object or person moving between an interior space or shielded environment and unobstructed open space.

These and other objects are attained in accordance with the present invention wherein there is provided a location positioning system for use in a shielded environment. The system includes a GPS receiver for receiving GPS signals and transmitting navigational data, a clock recovery unit for receiving the navigational data and reconstructing an accurate clock signal, a computer processing unit for receiving the accurate clock signal and the navigational data, and at least four pseudosatellites positioned within the shielded environment. One of the at least four pseudosatellites is non-coplanar relative to the others. The computer processing unit generates a respective GPS-type signal corresponding to each of the at least four pseudosatellites, and the respective GPS-type signal contains new orbital parameters for each corresponding pseudosatellite. According to one aspect of this invention, the GPS-type signals are transmitted into the shielded environment to be received by a receiver device located therein. The receiver device is capable of transmitting a location signal. In one particular implementation of this invention, there is further provided a computer and a location receiver associated therewith. The location receiver is positioned within the shielded environment to receive the location signal from the receiver device so that a precise position of the location receiver may be determined by the computer by processing the location signal. According to a specific use of this invention, the location device includes a cellular phone or alternatively a badge capable of being attached to a person moving within the shielded environment.

According to another embodiment of the present invention there is provided a personnel location and tracking system for use in a work-place environment. This embodiment includes a GPS receiver for receiving GPS signals and transmitting navigational data; a clock recovery unit for receiving the navigational data and reconstructing an accurate clock signal; a computer processing unit for receiving the accurate clock signal and the navigational data; at least four pseudosatellites positioned within the work-place environment, one of the at least four pseudosatellites being non-coplanar relative to the others, wherein the computer processing unit generates a respective GPS-type signal corresponding to each of the at least four pseudosatellites, the respective GPS-type signal containing new orbital parameters for each corresponding pseudosatellite; a receiver device carried by an individual moving within the work-place environment, the receiver device capable of transmitting a location signal, the GPS-type signals being transmitted into the work-place environment to be received by the receiver device; and computer means having a location receiver associated therewith, the location receiver being positioned within the work-place environment to receive the location signal from the receiver device so that a precise position of the individual carrying the location receiver may be determined by the computer means by processing the location signal.

In accordance with another embodiment of this invention, there is provided an inventory location and tracking system for use in a warehouse storage facility. This embodiment includes a GPS receiver for receiving GPS signals and transmitting navigational data; a clock recovery unit for receiving the navigational data and reconstructing an accurate clock signal; a computer processing unit for receiving the accurate clock signal and the navigational data; at least four pseudosatellites positioned within the warehouse storage facility, one of the at least four pseudosatellites being non-coplanar relative to the others, wherein the computer processing unit generates a respective GPS-type signal corresponding to each of the at least four pseudosatellites, the respective GPS-type signal containing new orbital parameters for each corresponding pseudosatellite; and a receiver device attached to a respective item of inventory in warehouse storage facility. This receiver device is capable of transmitting a location signal and the GPS-type signals are transmitted into the warehouse storage facility to be received by the receiver device. This embodiment further includes a computer having a location receiver associated therewith, the location receiver being positioned within the warehouse storage facility to receive the location signal from the receiver device so that a precise position of the respective item of inventory having the location receiver may be determined by the computer means by processing the location signal.

According to yet another embodiment of the present invention, there is also provided a personal communications and location system for use in an indoor environment. This system similarly includes a GPS receiver for receiving GPS signals and transmitting navigational data; a clock recovery unit for receiving the navigational data and reconstructing an accurate clock signal; a computer processing unit for receiving the accurate clock signal and the navigational data; at least four pseudosatellites positioned within the indoor environment, one of the at least four pseudosatellites being non-coplanar relative to the others, wherein the computer processing unit generates a respective GPS-type signal corresponding to each of the at least four pseudosatellites, the respective GPS-type signal containing new orbital parameters for each corresponding pseudosatellite; a receiver device in combination with a cellular phone carried by an individual moving within the indoor environment, the receiver device capable of transmitting a location signal, the GPS-type signals being transmitted into the indoor environment to be received by the receiver device; and a computer having a location receiver associated therewith. The location receiver is positioned within the indoor environment to receive the location signal from the receiver device so that a precise position of the individual carrying the location receiver may be determined by the computer by processing the location signal. The cellular phone thus providing a personal communication link with an operator of the computer.

In still yet a further embodiment of this invention there is provided a combined positioning system for locating an object moving between a shielded environment and unobstructed open space. This system includes a plurality of global positioning satellites in orbit around the Earth, each of the global positioning satellites broadcasting a standard GPS signal; a first GPS receiver for receiving the standard GPS signals and transmitting navigational data; a clock recovery unit for receiving the navigational data and reconstructing an accurate clock signal; a computer processing unit for receiving the accurate clock signal and the navigational data; at least four pseudosatellites positioned within the shielded environment, one of the at least four pseudosatellites being non-coplanar relative to the others, wherein the computer processing unit generates a respective GPS-type signal corresponding to each of the at least four pseudosatellites, the respective GPS-type signal containing new orbital parameters for each corresponding pseudosatellite; a receiver device attached to the moving object, the receiver device capable of transmitting a location signal, the GPS-type signals being transmitted into the shielded environment to be received by the receiver device; and a computer having a location receiver associated therewith, the location receiver being positioned within the shielded environment to receive the location signal from the receiver device so that a precise indoor position of the moving object having the location receiver may be determined by the computer means by processing the location signal when the object is within the shielded environment. This embodiment is also provided with a second GPS receiver attached to the moving object, the second GPS receiver for receiving the standard GPS signals when the object is in the unobstructed open space so that a precise outdoor position of the moving object having the second GPS receiver may be obtained.

Yet another embodiment of this invention is directed to an interior positioning system having a GPS receiver for receiving GPS signals and transmitting NAVDAT data, a clock recovery unit for receiving NAVDAT data and reconstructing an accurate clock signal, a computer for receiving the accurate clock signal and the NAVDAT data, the computer capable of calculating pseudosatellite data for at least four pseudosatellites, and the pseudosatellites capable of transmitting pseudosatellite data signals from the pseudosatellite data, wherein the pseudosatellite data signals are used for determining interior position. This embodiment may further include a second GPS receiver for receiving the pseudosatellite data signals, the second GPS receiver being capable of using the pseudosatellite data signals to determine the interior position of the second GPS receiver, and a link for communication between the second GPS receiver and the computer. This link may be implemented as a duplex system capable of relaying the position of the second GPS receiver to the computer and capable of relaying information from the computer to the second GPS receiver.

According to another aspect of this invention, there is provided a method for providing an interior positioning system. This method includes the steps of receiving GPS signals, reconstructing an accurate clock signal from the GPS signals, calculating orbital parameters for at least four pseudosatellites, and transmitting pseudosatellite data signals using the reconstructed clock signal and orbital parameters for at least four pseudosatellites. This method may further include generating NAVDAT information from the received GPS signals, using the NAVDAT information for calculating the orbital parameters for the pseudosatellites, and adding offsets to the NAVDAT information when calculating the orbital parameters, as well as delaying the reconstructed clock signal to account for different propagation time to each of the pseudosatellites.

In accordance with yet another aspect of this invention there is provided an interior positioning system having positional data regarding the physical position of at least four pseudosatellites, a clock unit for providing an accurate clock signal, a computer for calculating pseudosatellite data derived from the positional data and the clock signal, and a transmitter in communication to the computer for transmitting pseudosatellite data signals derived from the pseudosatellite data. This embodiment may further include a second GPS receiver for receiving the pseudosatellite data signals, the second GPS receiver being capable of using the pseudosatellite data signals to determine its interior position. In one particular implementation of this embodiment, there is further provided a link for communication between the second GPS receiver and the computer. This link may take the form of a duplex system capable of relaying the position of the second GPS receiver to the computer and capable of relaying information from the computer to the second GPS receiver.

According to yet another embodiment of the method of this invention the following steps are practiced. First, providing positional information regarding at least four pseudosatellites, then providing an accurate time signal, also calculating pseudosatellite data for each pseudosatellite by using the position information, and further transmitting the pseudosatellite data and the accurate time signal, the transmitting of the accurate time signal being delayed for each pseudosatellite to account for propagation delay.

BRIEF DESCRIPTION OF THE DRAWING

Further objects of the present invention together with additional features contributing thereto and advantages accruing therefrom will be apparent from the following description of certain preferred embodiments of the present invention which are shown in the accompanying drawing with like reference numerals indicating like components throughout, wherein.

DETAILED DESCRIPTION OF THE PREFERRED EMBODIMENTS

Figure 1:
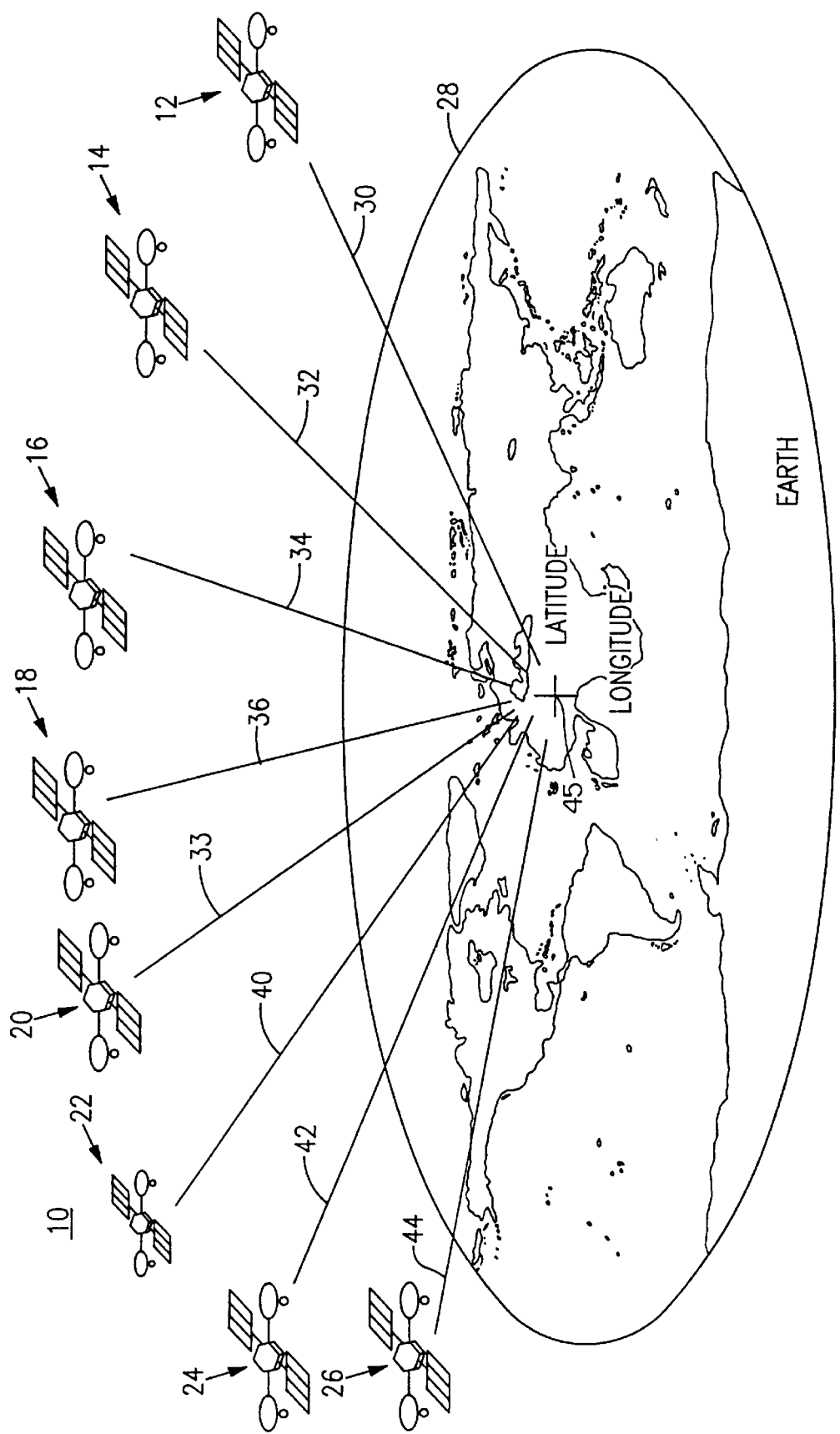
FIG. 1 is a graphical representation of a prior art Global Positioning System.
Figure 2:
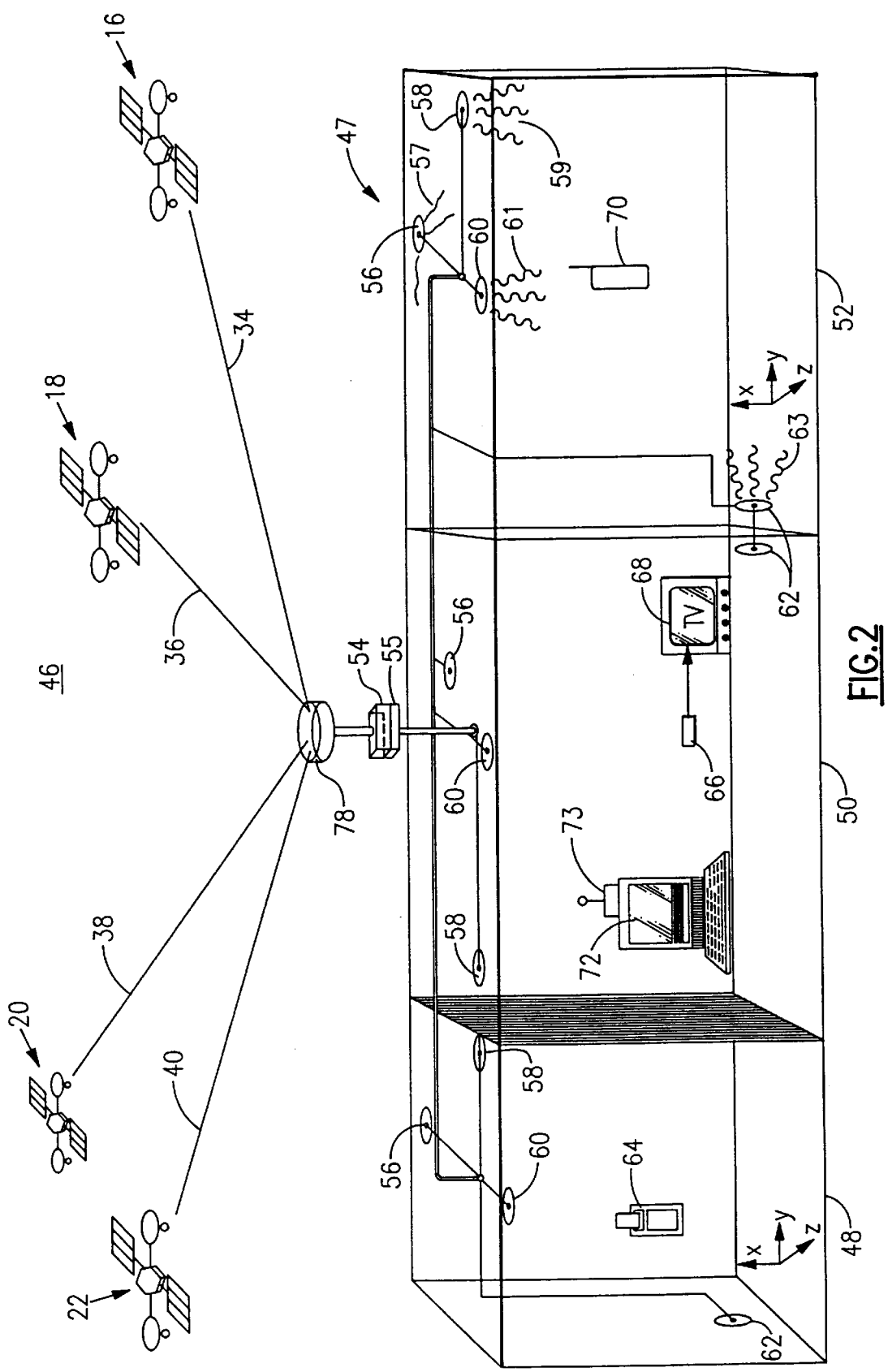
FIG. 2 is a graphical representation of one embodiment of the interior positioning system according to the present invention.

Referring now to the drawing and initially to FIG. 1, there is shown a global positioning system 10 according to the prior art. The system 10 is illustrative of the currently operating NAVSTAR Global Positioning System which includes many satellites represented by satellites 12–26 orbiting the Earth 28. A total of twenty-four (24) are actually used. The orbiting satellites 12–26 communicate or broadcast signals 30–44, respectively, to the Earth 28. The signals 30–44 contain two types of information. The first type of information is precise time encoded information and the second is extremely accurate encoded position information. A GPS receiver located at position 45, for example, is able to determine its exact location by measuring the difference between any four GPS signals and calculating the spatial distance or range to each satellite. The receiver then uses this data and the known position of each satellite to determine its own position in space, or on the surface of the earth. The NAVSTAR Global Positioning System is more fully described in *Aviator's Guide to GPS* by Bill Clarke and *The NAVSTAR Global Positioning System* by Tom Logsdon, the teachings of which are herein recognized to comprise part of the prior art related hereto. The current GPS system, however, does not function in many situations. Such situations include, for example, locations within a building structure, inside an urban environment having a variety of tall structures, underwater, inside dense forests, and underground. Turning now to FIG. 2, there is shown one embodiment of an internal positioning system 46 according to the present invention. The illustration of FIG. 2 shows a building 47 having a first room 48, a second room 50, and a third room 52. Three different uses of the interior positioning system 46 are illustrated in FIG. 2. These different uses will be briefly described before further discussing in detail the specific components of the interior positioning system 46.

In the first use, a badge 64 is enabled to determine its internal position. The badge 64 may be provided with an optional transmitter (not shown) to report the badge position. In the second use, a pointer 66 is enabled to relate its internal position to the position of another known object such as a television set 68. By establishing the relative position of two objects, a pointing vector may be determined. In the third use, a cellular phone 70 is shown as being enabled to determine its location with precise accuracy and use that location information to beneficial advantage.

In connection with the third use discussed above, it is currently contemplated that satellites will soon be able to perform spot beam searches for specific phones in specific cellular regions. For such an advanced roaming cellular phone system to function appropriately, a cellular phone must be able to determine its position and communicate this information when activated in an entirely different area. In this manner, a Los Angeles based cellular phone could be used in New York City. The cellular phone 70 is herein currently enabled to function in this manner. When the self-locating cellular phone 70 is activated in New York City, the cellular phone 70 reports its interior or exterior position and thereby activates a new local area. There are thus proposed herein various configurations of internal positioning system receivers according to the present invention. The cellular phone 70, for example, contains a standard GPS receiver which is provided with an interface to the cellular phone function. The badge 64 and the pointer 66 may contain a more specialized receiver which responds to multiple messages contained in the GPS-type signal described below. These messages can contain specialized information, such as street address, zip codes, area codes and the like, to enable more specific system functions.

With continuing reference to FIG. 2, the GPS satellites 16–22, for example, direct GPS signals 34–40, respectively, toward the building 47. The signals 34–40 are communicated to a receiving and distribution system 54. The receiving and distribution system 54 distributes corresponding GPS-type signals to internal antennas or pseudosatellites 56–62, one of each being positioned in each of the rooms 48–52 as illustrated. The embodiment of the interior positioning system 46 shown in FIG. 2 employs four channels which transmit new RF GPS-type signals modulated with orbital data corresponding to the actual location of pseudosatellites 56–62. The form of the modulation is identical to the form of a standard GPS signal. The specific data contained is developed internally by the internal positioning system 46. The receiving and distribution system 54 makes appropriate changes to each of these signals to allow for positional offset. An example of positional offset is discussed below in conjunction with FIG. 10.

The rooms 48–52 are preferably electronically isolated from each other. This ensures that interior positioning system signals from any one room do not transmit into another room. When the rooms 48–52 are not electronically isolated from each other, only one set of pseudosatellites 56–62 is required. Alternatively, it is contemplated to share a pseudosatellite or any combination thereof between two or more different rooms. This aspect of the present invention is illustrated by pseudosatellite 62 being shared between the two rooms 50 and 52, as illustrated in FIG. 2. This type of sharing is possible even when the two rooms are electronically isolated from each other. The internal positioning system 46 may be implemented in any single or multiple room structure as long as the RF carrier frequency, or other carrier frequency, can penetrate the walls. In addition, the four pseudosatellites are preferably positioned in the room in opposite diagonal corners to maximize the distances therebetween so as to in turn, maximize the accuracy of the positioning capabilities of the internal positioning system 46.

Figure 3:
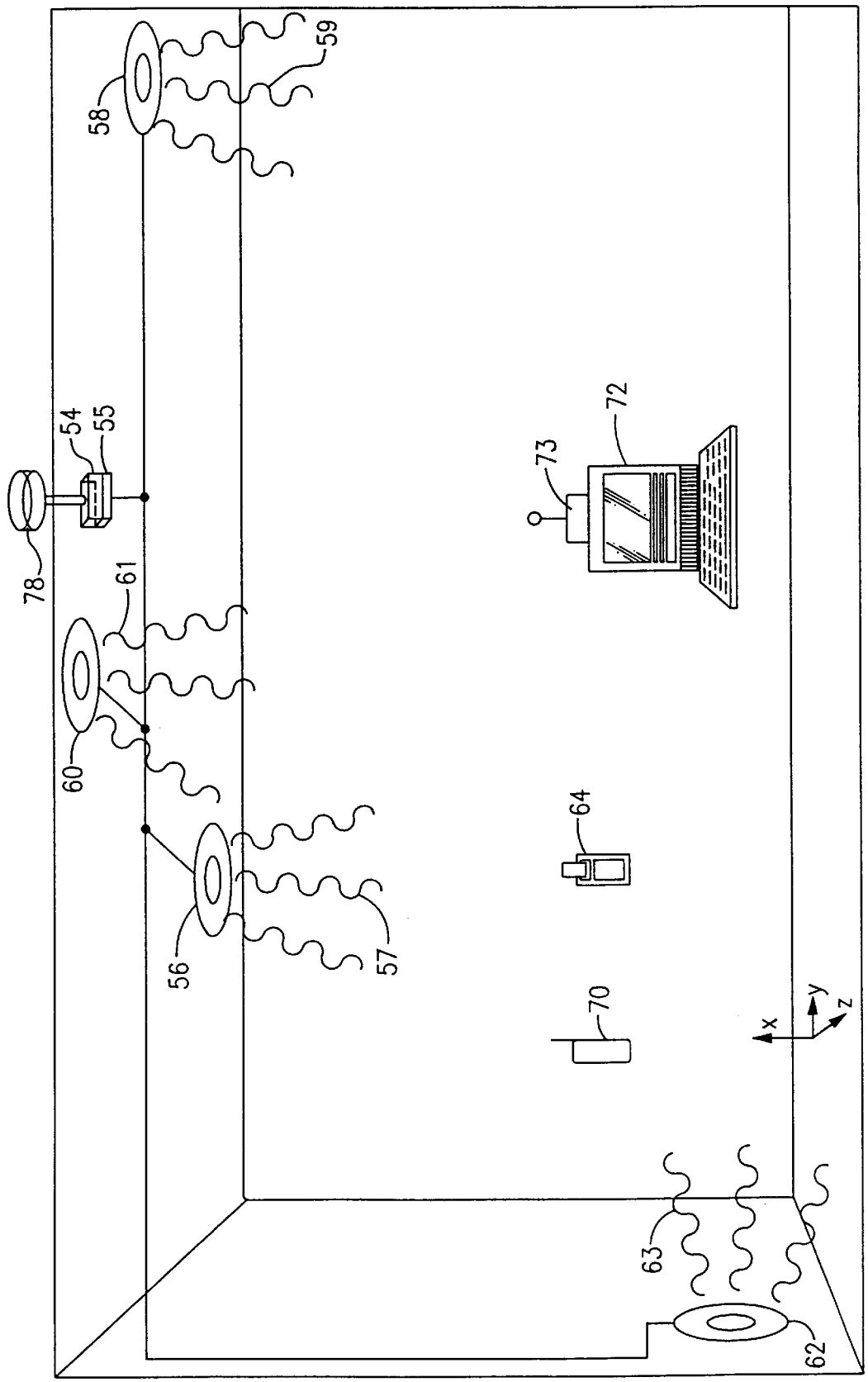
FIG. 3 is a graphical representation of another embodiment of the interior positioning system according to this invention.

As shown in FIGS. 2 and 3, the badge 64 and cellular phone 70 are enabled to determine their interior position using a standard GPS receiving antenna 78, and the receiving and distribution system 54 as next described in detail.

The distribution system 54 is provided with a computer processing unit 55 that converts each of the standard GPS signals 34–40 into a corresponding or interior GPS-type signal that includes the GPS time component and a position component with new orbital parameters. This processing will be described in further detail below. The GPS-type signals generated by the processing unit 55 are each hardwired into a respective and corresponding pseudosatellite. Thus, the new orbital parameters generated by the processing unit 55 relate to the exact physical location of each corresponding pseudosatellite relative to the room in which it is positioned. The present internal positioning system 46 requires a minimum of four GPS satellites each emitting a standard GPS signal, and a related minimum of four corresponding pseudosatellites each receiving over hard wire, a modulated GPS-type signal provided by the processing unit 55. Of the minimum of four corresponding pseudo satellites required by the internal positioning system 46, one pseudosatellite thereof must be non-coplanar relative to the others. This requirement is illustrated in FIGS. 2 and 3 by pseudosatellite 62 being positioned in non-coplanar relation to the pseudosatellites 56, 58, and 60.

In continuing description of the internal positioning system 46, each of the pseudosatellites 56, 58, 60, and 62 produces a respective signal 57, 59, 61, and 63 which is transmitted into a respective electronically isolated room. The badge 64 and cellular phone 70 are each provided with a receiver capable of receiving the signals 57, 59, 61, and 63. The badge 64 and cellular phone 70 are in turn enabled to transmit their exact position back to a computer system 72 equipped with a receiver antenna 73. The computer system 72 is provided with processing software capable of computing the precise location of the badge 64 or the cellular phone 70 relative to its localized internal or shielded environment. This location information may be printed-out or displayed on a monitor in any desired form such as floor and room number. In addition thereto, it is herein contemplated that a customized grid for each specific environment, building, or area can be developed and programmed into the computer system software so that output location data might be presented in terms of known zones, sectors, or other charting or surveying coordinates. Thus in this use, an operator of the computer system 72 can determine the location of people internal to a building who are equipped with either the badge 64 or the cellular phone 70. In the case of an individual carrying the phone 70, the computer operator may rapidly communicate with them on an individual basis.

It is to be understood that the present invention is not limited to use with the badge 64 or cellular phone 70, but rather may be used in conjunction with a pager, a portable computer, a personal digital assistant, a watch, a robot, inventory, or numerous other stored objects or items customarily carried by individuals moving within a particular environment. In addition thereto, it should be appreciated that not every room requires a computer system 72. In the embodiments wherein the rooms are electronically isolated, each such room is provided with a receiver 73. In this situation, all of the receivers 73 are connected to a single computer system 72 which may be placed in any desired location-even locations miles or hundreds of miles away from the building or environment in which the internal positioning system 46 is installed.

Figure 4:
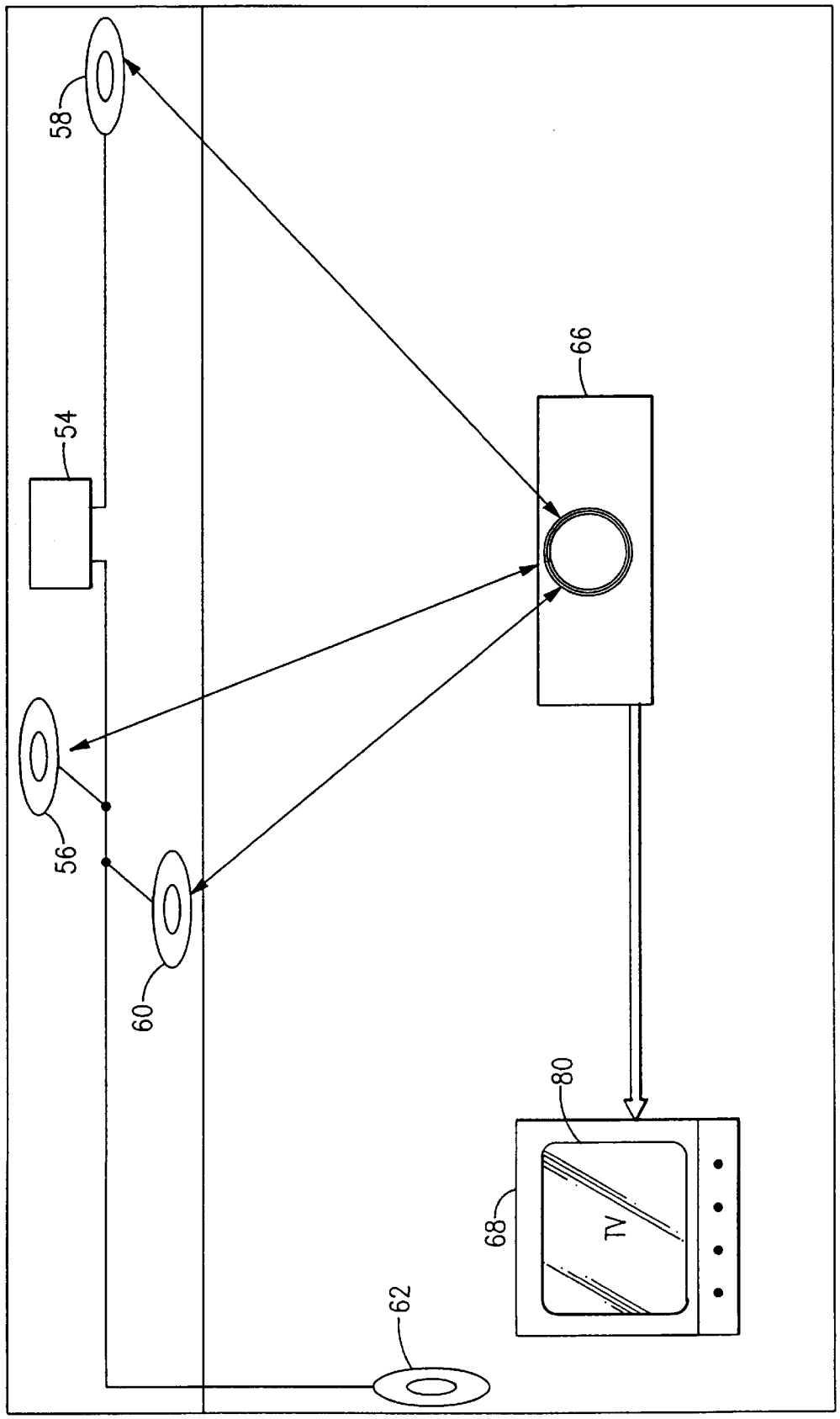
FIG. 4 is graphical representation of yet another embodiment of the interior positioning system according to the teaching of the present invention.

Referring now to FIG. 4, the pointer 66 is shown in relationship to the television 68 in greater detail. Prior hereto, various devices have been proposed for interactive use with a television. Such devices include touch sensitive screens, mouse-type control devices, remote control devices, and others. This use of the internal positioning system 46 relates the pointer 66 to the television 68. The pointer 66 is preferably a receiver with orientation determining capabilities provided, for example, by a gyroscope. By determining the location of the television 63 and the pointer 66 in the manner described above, a pointed-to-location 80 can be realized. This pointed-to-location can be advantageously used in interfacing with television images.

Figure 5:
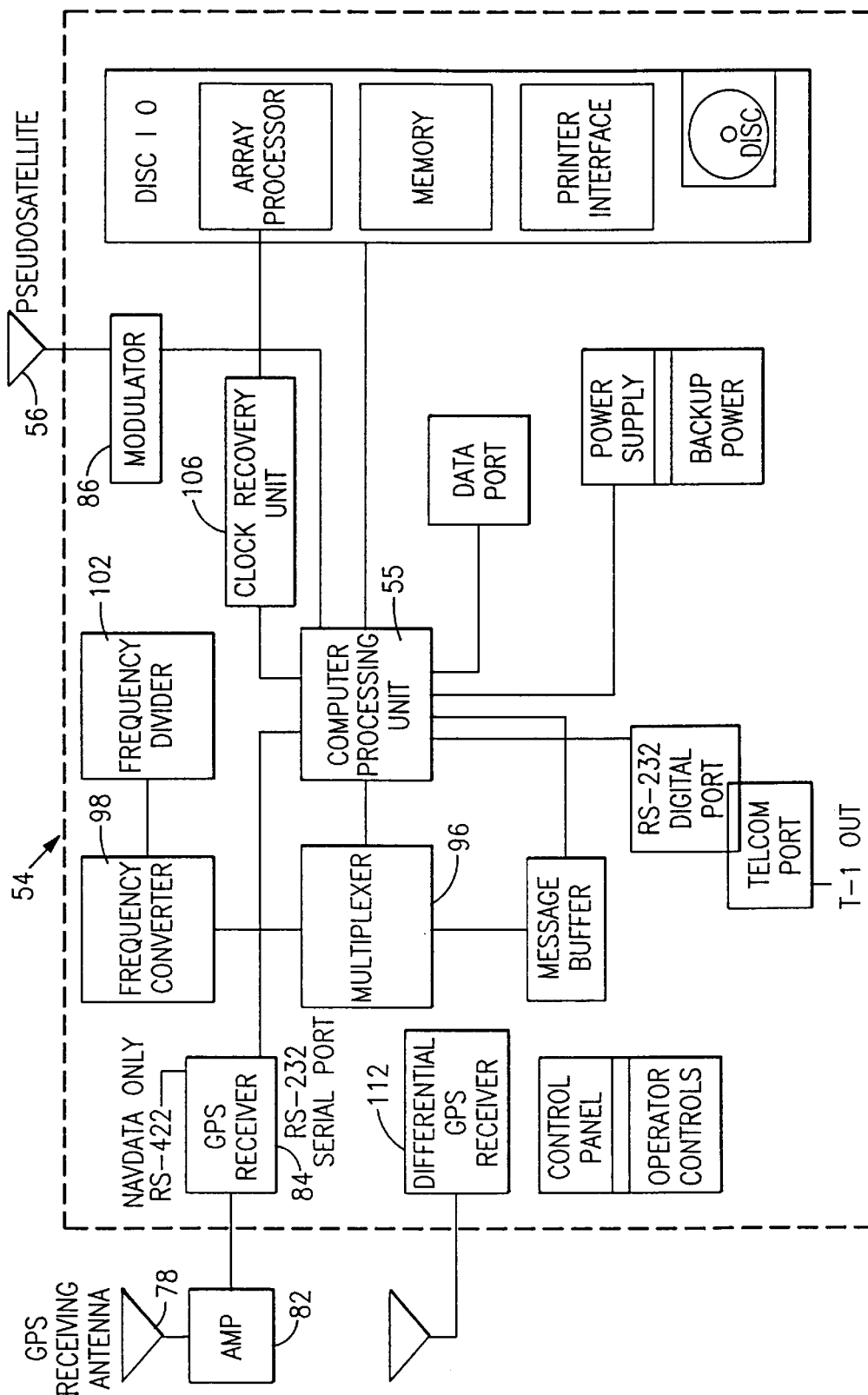
FIG. 5 is a block diagram of hardware employed in conjunction with the interior positioning system of this invention.

FIG. 5 shows the hardware for the receiving and distribution system 54. The antenna 78 is used for receiving the GPS signals 30–44. The antenna 78 then communicates with a power amplifier 82 which is used to amplify and retransmit the signals to a receiver 84. The receiver 84 is used to select the appropriate GPS channels for demodulation, decoding, and calculation of time and navigational data (NAVDAT). The GPS receiver 84 is used to determine the position of the receiving antenna 78. The computer processing unit 55 is used to manage the signals from a multiplexer 96, a frequency converter 98, and a frequency divider 102. A differential GPS reference receiver 112 is used to perform differential GPS calculations in any embodiment of the internal positioning system 46 that may be in relative motion to the Earth 28. Higher resolution and accuracy can be realized through use of differential GPS over time. According to this method of operation, the position of each system is compared and the sum of the comparison of a larger number of measurements averages out to give a more accurate reference position.

The processing accomplished in the receiving and distribution system 54 by the computer processing unit 55, includes computing and multiplexing the positional offset, registering movement, and recording a history of each badge 64 or cellular phone 70. This processing also includes differential GPS information when required by the internal positioning system 46. The preferred processing software is shown in the flow chart of FIG. 6. Additional aspects of FIG. 5 will be discussed in further detail below in conjunction with FIG. 7.

Figure 6:
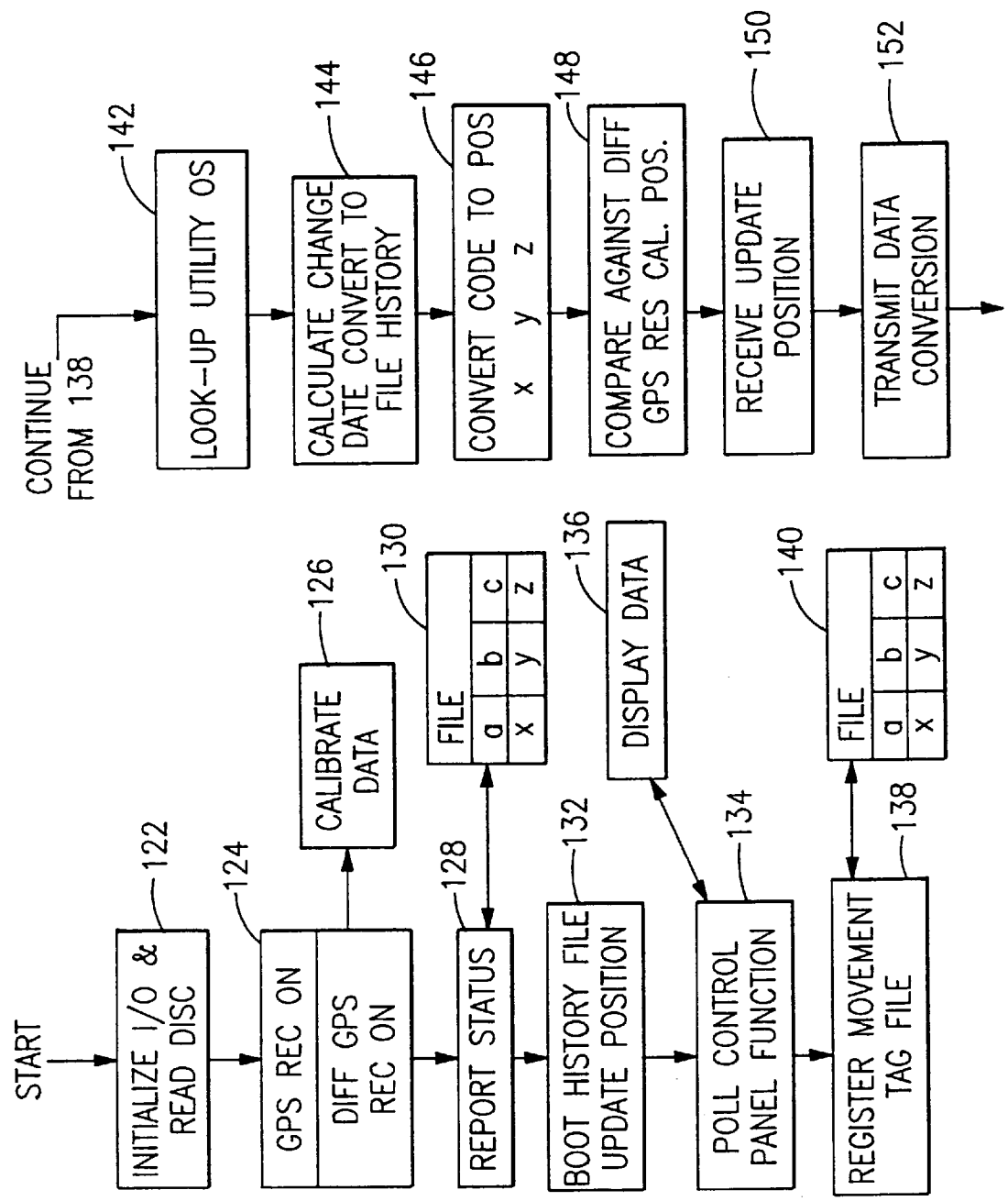
FIG. 6 is a flow chart of software used in conjunction with the present interior positioning system.

With reference now to FIG. 6, one embodiment of software used to run the internal positioning system 46 is shown.

It should be understood that various other features and embodiments of the software are possible for use with the internal positioning system 46, and that the following embodiment is an illustrative, non-limiting example thereof. In this embodiment, the processing starts with the initialization block 122. The GPS receiver 84 and differential GPS receiver 112 are initialized and calibrated in blocks 124 and 126. A report status software block 128 accepts the status from the GPS receiver 84 and the differential GPS receiver 112, and then collaborates data and interacts with a file holding information regarding previous history files of a particular badge 64 or cellular phone 70. A boot history file 132 contains updated positions on transition activity that has taken place since the report status was last generated. A poll control panel function block 134 drives a data display number 136 which functions as an operator control monitoring station that displays positional location of various objects. A registered movement tag file block 138 interacts with a file block 140 to continuously monitor position locations. A look-up software module 142 interacts with the operating system of the computer processing unit 55. Software blocks or modules 144 and 146 record changes to a history file on the internal positioning system 46. This system history file is preferably maintained so as to determine location. Block 148 is optional and used for differential GPS processing of information received form the differential receiver 112 when employed as required by a specific system implementation. A receive update block 150 receives an updated position from differential GPS receiver 112. A transmit data block 152 transmits the processed data to a desired location.

Figure 7:
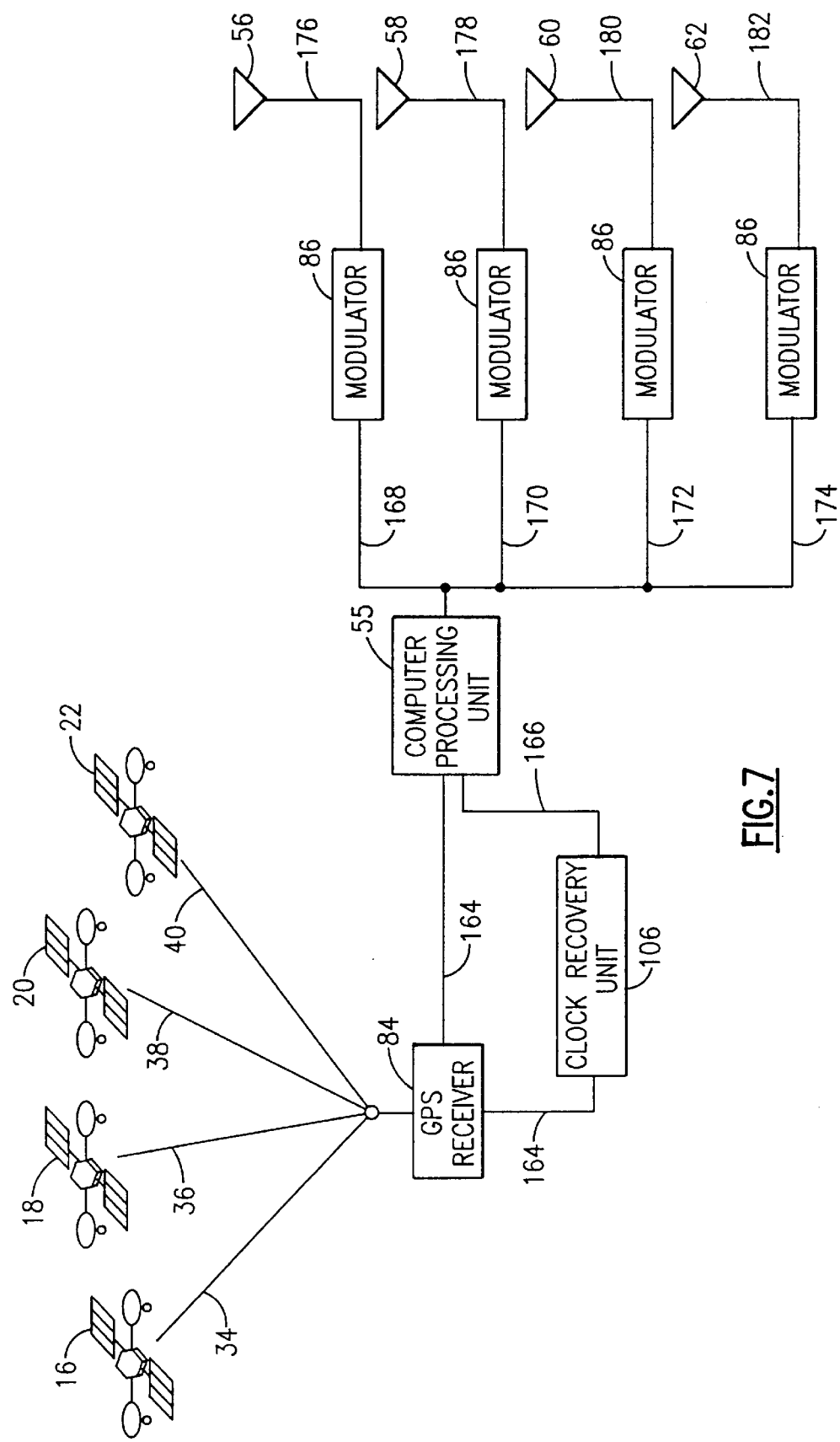
FIG. 7 is a block diagram showing the overall structure of one embodiment of the interior positioning system according to this invention.

Referring to FIG. 7, there is shown a particular group of the satellites 16–22 having the corresponding standard GPS satellite signals 34, 36, 38, and 40 as discussed above in conjunction with FIGS. 1 and 2. Each of the satellites 16–22 broadcasts its own unique coded message continuously. The corresponding satellite signals 34–40 each have a message structure containing three basic components.

The first of these three basic components is a Coarse Acquisition code signal, or C/A code. This coarse acquisition code signal is a 1.023 MHz carrier that is phase modulated using binary phase shift keying, or BPSK, by the pseudorandom code assigned to each of the satellites 16–22. The pseudorandom code is a fixed series of binary bits having a length of 1,023 bits. Each satellite 16–22 broadcasts using an assigned and specific code algorithm. The code algorithms are well defined in GPS related literature.

The second of the three basic components of the standard GPS signal is a Precision code signal, or P code. The precision code is BPSK modulated at 10.23 MHz. This precision code is a pseudorandom code and is significantly long containing specific satellite identification data similar to the C/A code.

Lastly, the third basic component of a GPS signal is satellite data. This satellite data modulates both the precision code and the coarse acquisition code at 50 bits per second, again using BPSK modulation. The satellite data includes several information categories, the most pertinent being ephemeris data for each GPS satellite. Ephemeris data describes the orbital path of the satellite in terms defined by the Inertial Coordinate System. The Inertial Coordinate System is based on Earth's center of gravity or COG, in which the North Celestial pole defines a Z axis through the COG, and the plane of the Celestial Equator is perpendicular to the Z axis and intersects the COG. The orbital parameters of the satellite are defined in terms of right ascension, inclination, argument of perigee, semi-major axis, and eccentricity, as well as specific parameters of time and mean anomaly. Almanac data for all satellites is also included in the satellite data.

The GPS receiver 84 as shown in FIG. 7, computes precise location information by using the satellite signals 34–40. The GPS receiver 84 computes its own location using data from at least four satellites 16–22. Additional satellites which are in view, however, will necessarily add to the data from which the GPS can select the minimum of four signals. The GPS receiver 84 determines the pseudorange to each satellite and solves for the user, a position in terms of latitude, longitude, and altitude. The pseudorange measurement has two principal sources of inaccuracy. These include the clock timing error and propagation variations. The GPS receiver 84 outputs a NAVDAT data signal 164 via an RS422 serial data port. The NAVDAT data signal 164 contains navigational data and GPS almanac data. This navigational data includes latitude, longitude, altitude, and time of day. The GPS almanac data includes GPS week number, satellite health, and almanac ephemeris data.

With continuing reference now to FIGS. 5 and 7, a clock recovery unit 106 receives NAVDAT data signal 164 which includes a coarse time signal and a receiver clock oscillation signal. The clock recovery unit 106 outputs a precision clock signal 166 at 10.23 MHz clock which has a precision equivalent to the atomic clock standard.

Figure 10:
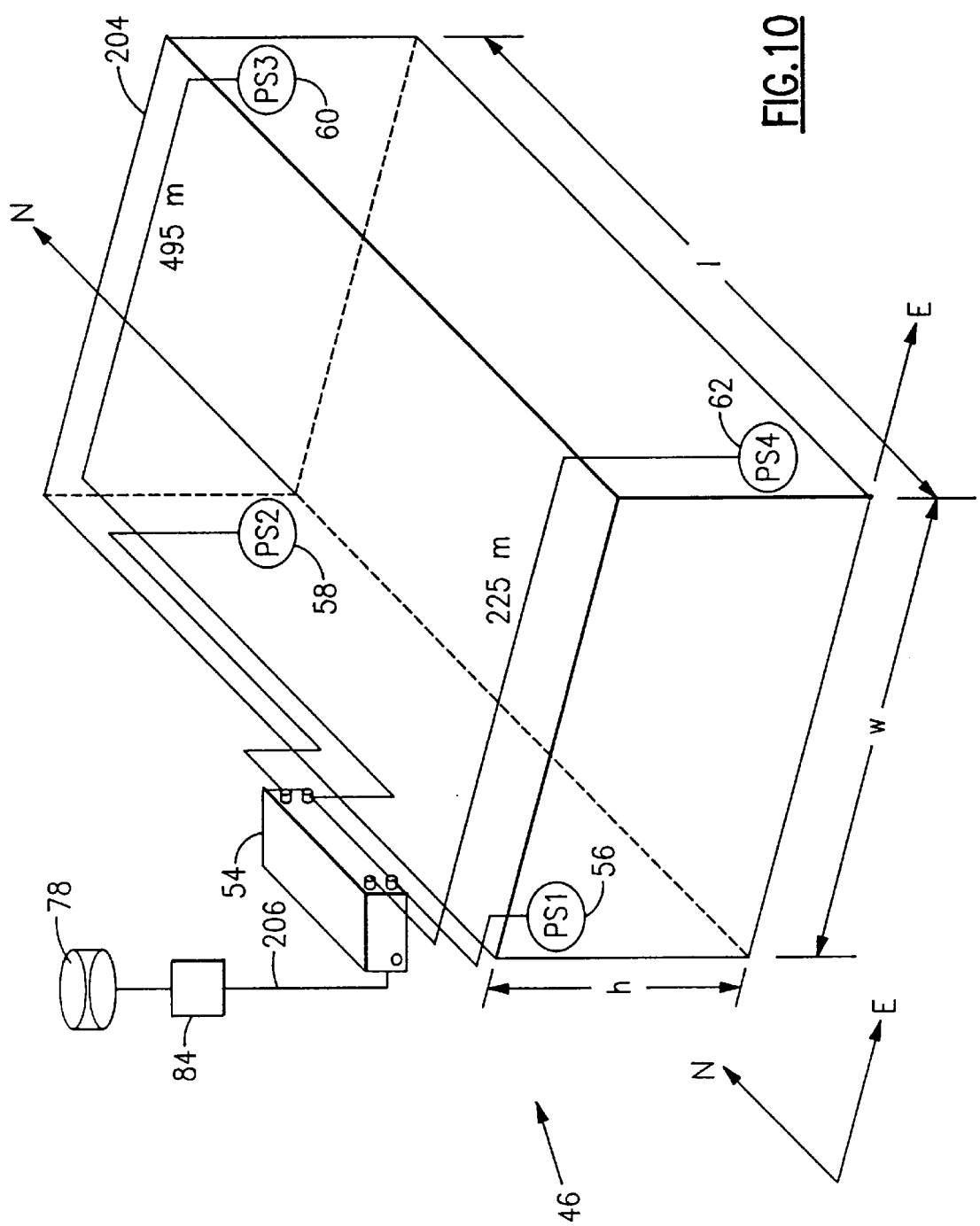
FIG. 10 is a detailed graphical representation of the structure having an interior positioning system according to this invention as presented in Example 1 below.

The computer processing unit 55 utilizes the precision clock signal 166 and the NAVDAT data signal 164 in addition to data supplied by an operator. This additional data assists in defining the physical offsets of each pseudosatellite location. One aspect of this invention is to transmit the GPS-type signal of satellite information from each of the pseudosatellites or antenna 56–62. In view thereof, these antenna are herein considered to be "pseudosatellites" since the standard GPS signal has been modified to contain new orbital information relating to the orbit of each pseudosatellite around the Earth. The physical offset and time offset, which are covered in greater detail in discussion relating to FIG. 10 are added by the computer processing unit 55. GPS-type signals 168, 170, 172, and 174 are, respectively, the coarse acquisition code, the precision code, and the satellite data for each of the pseudosatellite 56, 58, 60, and 62. A modulator 86 combines these signals using BPSK modulation and regenerates the RF carrier. Pseudosatellite data signals 176, 178, 180, and 182 are the respective driver signals for the pseudosatellites 56, 58, 60, and 62.

Figure 8:
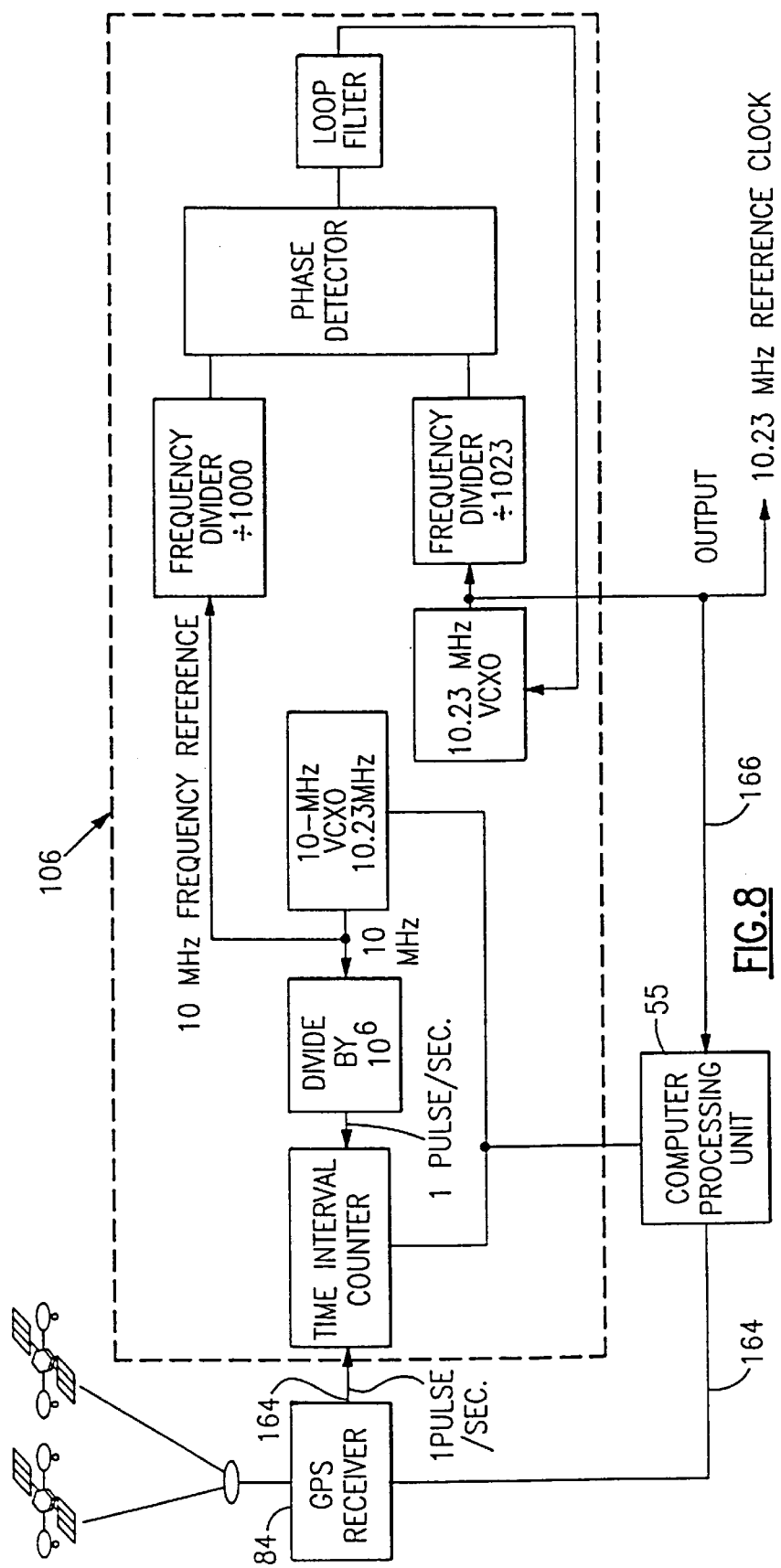
FIG. 8 is a detailed block diagram further illustrating the clock recovery unit discussed in conjunction with FIG. 7.

The clock recovery unit 106 employed in conjunction with the present invention is shown in greater detail in FIG. 8. The clock recovery unit 106 receives the NAVDAT data signal 164 from the GPS receiver 84. The clock recovery unit 106 generates the precision clock signal 166 which has an accuracy equivalent to the atomic clock standard. The clock recovery unit 106 provides frequency synthesis at 10.23 MHz using a conventional phase lock loop. Several commercially available GPS accessories will perform the functions required by the clock recovery unit 106. The Hewlett Packard 58503A, for example, will provide the precision clock signal 166.

Figure 9:
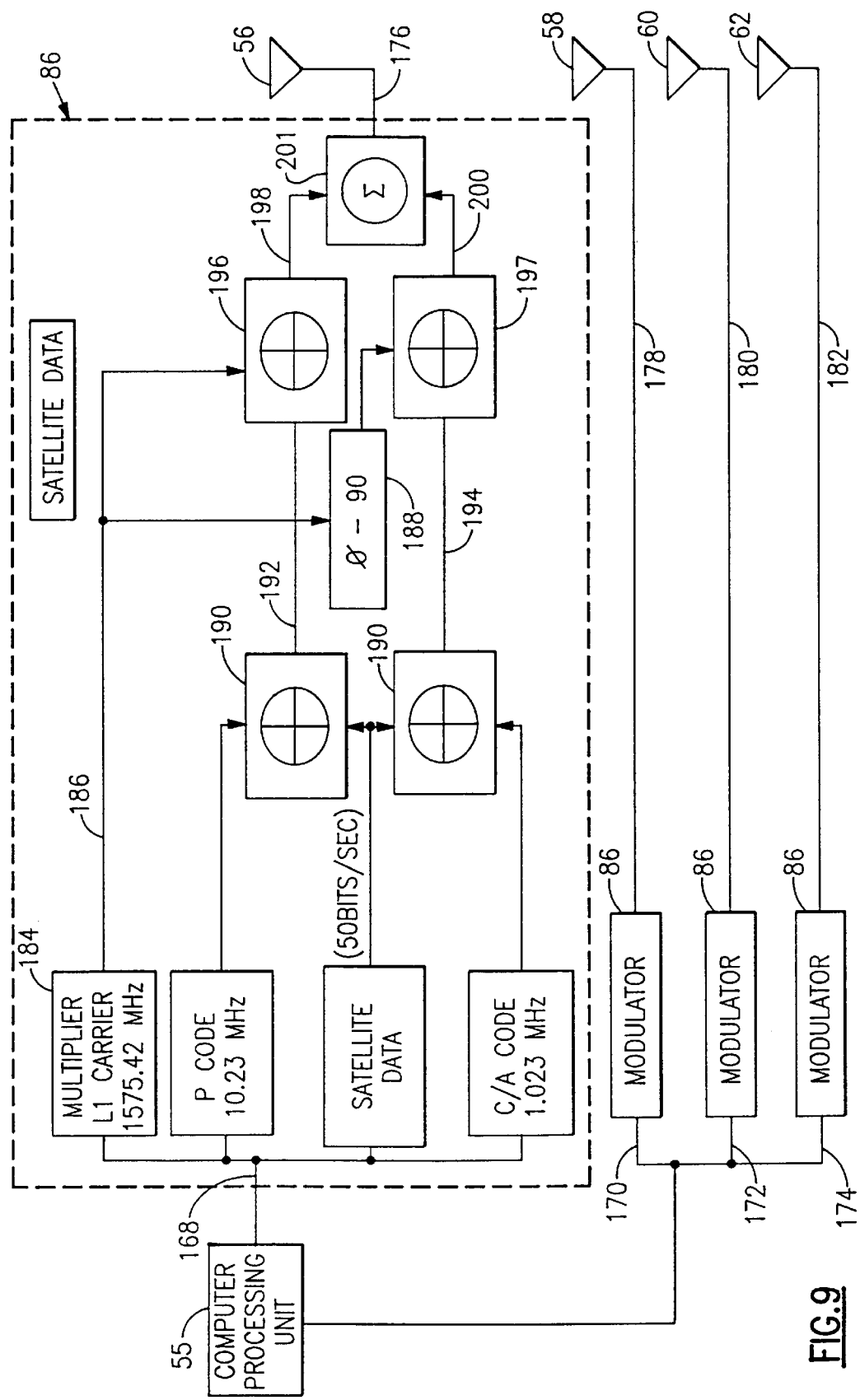
FIG. 9 is a detailed block diagram directed to the modulator as employed in connection with the present invention.

Further aspects of the modulators 86 will now be described in detail with reference to FIG. 9. The computer processing unit 55 generates the GPS-type output signals 168, 170, 172, and 174 which contain coarse acquisition code, precision code, satellite data, and the precision clock signal 166. The precision clock signal 166 is multiplied by the number 154 in the multiplier block 184 to produce an L1 carrier signal 186. The P code, satellite data code, and coarse acquisition code are processed through exclusive-OR circuitry 190 to produce BPSK output signals 192 and 194. The BPSK output signal 192 and the L1 carrier signal 186 are combined in an RF modulator 196 to produce a signal 198. The BPSK output signal 194 and a phase shifted signal stemming from signal 184, are combined in an RF modulator 197 to produce signal 200. As shown in FIG. 9, the signals 198 and 200 are summed to produce the pseudosatellite data driver signal 176 corresponding to pseudosatellite 56. Satellite data contained in this GPS-type signal contains ephemeris data which describes the orbit of the pseudosatellite in terms that the standard GPS receiver can use in its calculations. Additionally, the satellite data contains any special messages required for the specific system.

A specific example of the internal positioning system 46 will now be presented and described with reference with FIG. 10.

EXAMPLE 1

FIG. 10 shows a detailed example of the interior positioning system 46 in a hypothetical room 204 having a width w of 200 meters, a length l of 300 meters, and a height h of 20 meters. This hypothetical room 204 has walls which parallel north, south, east, and west, and uses the interior positioning system 46 having coaxial cable with a propagation velocity of 0.6. In this example, the latitude, longitude, and altitude coefficients for pseudosatellites 56, 58, 60, and 62 as well as the time delay will be calculated. Pseudosatellite 56 is a distance of 5 meters south of the receiving and distribution system 54 in the upper portion of the southwest corner of room 204 and on the same altitude with the GPS receiving and distribution system 54. Pseudosatellite 58 is located a distance of 295 meters north of the GPS receiving and distribution system 54 and a distance of 20 meters therebelow. The coaxial cable attached to pseudosatellite 58 is 315 meters long. Pseudosatellite 60 is a distance 295 meters north, 200 meters east, and level with respect to GPS receiving and distribution system 54. Pseudosatellite 60 has a coaxial cable of 495 meters connecting it to the receiving and distribution system 54. Pseudosatellite 62 is 5 meters south, 200 meters east, and 20 meters below the receiving and distribution system 54. Pseudosatellite 62 is connected with a 225 meter coaxial cable. The length of antenna cable 206 does not affect the operation of the interior positioning system 46 because the resulting uniform clock bias which appears on each channel is canceled. Thus the NAVDAT from the GPS receiver 84, FIG. 5, contains the correct antenna location. Since the GPS receiver 84 is directly below the antenna 78, no additional latitude or longitude correction is required. For the antenna 78, being herein positioned 30 meters above the receiving and distribution system 54, there is imposed a fixed altitude offset of −30 meters on each pseudosatellite 56, 58, 60, 62. The pseudosatellites 56, 58, 60, and 62 are displaced in three dimensions expressed in terms of latitude, longitude, and altitude with reference to the antenna 78. These actual distances are readily measured. The angular offsets are used to calculate orbit parameters which are transmitted in the satellite data emanating from pseudosatellites 56–62. These angular offsets are calculated using a conversion to angular measure. Furthermore the time delay is calculated with respect to cable length and propagation coefficient. The time delays are used to control the time that the computer sends each frame of data. For instance, the time delay for a 200 meter coaxial cable will be longer than that for a 100 meter coaxial cable of the same type. In this case, the computer processing unit 55 transmits the data frame for the 200 meter coaxial cable earlier than that for the 100 meter coaxial cable. The time delay for use of various lengths of each element of coaxial cable is similarly time-controlled by the computer processing unit 55. The specific offsets for the hypothetical room 204 of FIG. 10 are set out in Table 1 below.

TABLE 1

| Pseudosatellite | 56 | 58 | 60 | 62 |
|---|---|---|---|---|
| Latitude, minutes of arc | −.000548 | 0.0323 | 0.0323 | −0.000548 |
| Longitude, minutes of arc | 0 | 0 | 0.002646 | 0.002646 |
| Altitude, meters | −30 | −50 | −30 | −50 |
| Time Delay, nanoseconds | 2.775 | 174.825 | 274.725 | 124.875 |

Based upon these offsets, the computer formulates the parameters for each pseudosatellite 56, 58, 60, and 62 by a specific method. This method includes the following steps:

1. Convert latitude, longitude, altitude, and time to internal positioning system ephemeris data format;
2. Store data in allocated registers for delayed retransmission to outputs;
3. Assign pseudorandom code numbers and compute orbital parameters;
4. Add other internal positioning system formatted data, including telemetry, hand over word, as required by each conventional receiver; and
5. Assign additional data to each pseudosatellite data word for specialized receiver functions.

Figure 11:
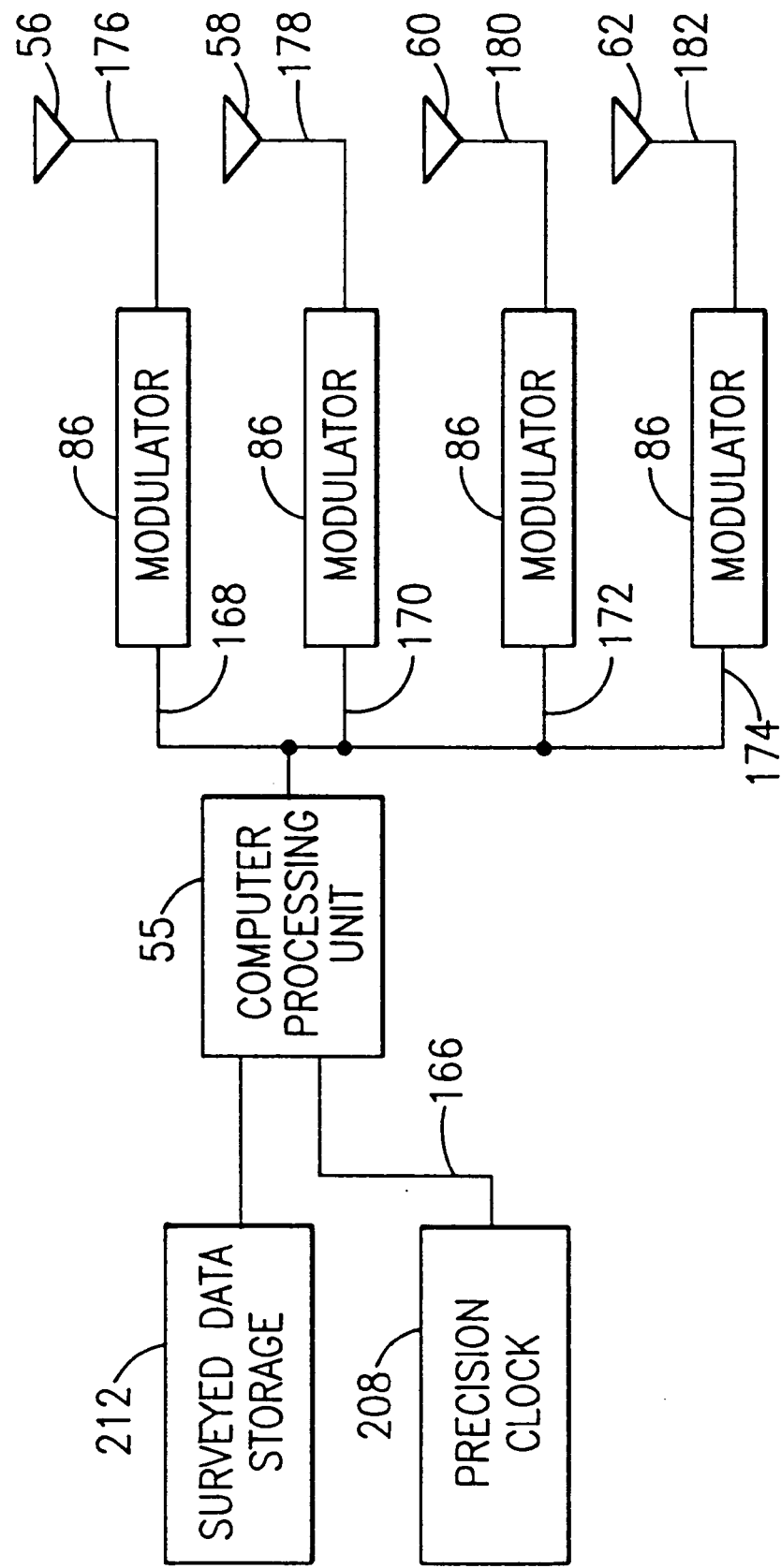
FIG. 11 is a block diagram similar to that of FIG. 7, showing the overall structure of another embodiment of the interior positioning system according to this invention.

With reference now to FIG. 11, another embodiment of the internal positioning system 46 will be discussed in detail. In this embodiment, the GPS receiving antenna 78, the power amplifier 82, and the GPS receiver 84 are eliminated. In place of using the standard GPS signals 30–44, the positions of each pseudosatellite 56, 58, 60 and 62 is inputted directly to the computer processing unit 55 in terms of latitude, longitude, and altitude. This data may be derived, for example, from surveyor's measurements. The clock recovery unit 106 would be replaced by a precision clock. Standard precision clocks such as an atomic clock, a WWV clock, or United States Naval Observatory based clock may be used. In this embodiment without the GPS receiver 84, the computer operator supplies the positional data to the computer processing unit 55 directly. The remaining operations for the processing unit 55 and the pseudosatellites 56–62 are the same as described above.

While this invention has been described in detail with reference to certain preferred embodiments, it should be appreciated that the present invention is not limited to those precise embodiments. Rather, in view of the present disclosure which describes the current best mode for practicing the present invention, many modifications and variations would present themselves to those of skill in the art without departing from the scope and spirit of this invention. The scope of this invention is, therefore, indicated by the following claims rather than by the foregoing description. All changes, modifications, and variations coming within the meaning and range of equivalency of the claims are to be considered within their scope.

What is claimed is:

1. An interior positioning system comprising:

positional data regarding the physical position of at least four pseudosatellites;

a clock unit for providing an accurate clock signal;

a computer for calculating pseudosatellite data derived from the positional data and the clock signal; and a transmitter in communication to the computer for transmitting a pseudosatellite data signals derived from the pseudosatellite data.

2. The interior positioning system of claim 1 further comprising a second GPS receiver for receiving the pseudosatellite data signals, said second GPS receiver being capable of using the pseudosatellite data signals to determine its interior position.

3. The interior positioning system of claim 2 further comprising means for communication between said second GPS receiver and said computer.

4. The interior positioning system of claim 3 wherein said means for communication is a duplex system capable of relaying the position of the second GPS receiver to the computer and capable of relaying information from the computer to the second GPS receiver.

5. A method for providing an interior positioning system comprising:

providing positional information regarding at least four pseudosatellites;

providing an accurate time signal;

calculating pseudosatellite data for each pseudosatellite by using the position information;

transmitting the pseudosatellite data and the accurate time signal, said transmitting of the accurate time signal being delayed for each pseudosatellite to account for propagation delay.

\* \* \* \* \*